(12) United States Patent
Simopoulos

(10) Patent No.: US 7,724,555 B1
(45) Date of Patent: May 25, 2010

(54) POWER CONVERTER WITH SYNCHRONOUS RECTIFICATION AND DIGITAL CURRENT SHARING

(76) Inventor: Anastasios Simopoulos, 2 Otis Pratt La., Middleboro, MA (US) 02346

( * ) Notice: Subject to any disclaimer, the term of this patent is extended or adjusted under 35 U.S.C. 154(b) by 140 days.

(21) Appl. No.: 11/152,915

(22) Filed: Jun. 15, 2005

(51) Int. Cl.
*H02M 7/217* (2006.01)
(52) U.S. Cl. .......................... 363/127; 363/50; 323/223
(58) Field of Classification Search ................ 363/127, 363/53, 67, 69–70; 323/223, 272
See application file for complete search history.

(56) References Cited

U.S. PATENT DOCUMENTS

| | | | | |
|---|---|---|---|---|
| 4,858,096 A | * | 8/1989 | Onda et al. .................... | 363/22 |
| 6,618,274 B2 | * | 9/2003 | Boylan et al. .................. | 363/17 |
| 7,224,590 B2 | * | 5/2007 | Lin .......................... | 363/21.06 |
| 2003/0048644 A1 | * | 3/2003 | Nagai et al. .............. | 363/21.09 |
| 2004/0027101 A1 | * | 2/2004 | Vinciarelli ................... | 323/259 |

* cited by examiner

*Primary Examiner*—Harry Behm
(74) *Attorney, Agent, or Firm*—Kristofer E. Elbing

(57) ABSTRACT

Converters that employ synchronous rectification, such as DC/DC converters, are disclosed. These converters can control their synchronous rectifiers to selectively block or pass a negative current from flowing in their output lines. Also disclosed are converters which can operate as slaves based on timing signals from other daisy-chained converters. Open-loop synchronous rectifier driving circuitry is further disclosed to allow converters to operate independently of any timing information from their output stages.

6 Claims, 10 Drawing Sheets

POWER CONVERTER WITH SYNCHRONOUS RECTIFICATION AND DIGITAL CURRENT SHARING

FIELD OF THE INVENTION

This invention relates to converters, such as DC/DC converters, including wide input power converters with synchronous rectification and digital current sharing.

BACKGROUND OF THE INVENTION

The ever-increasing need for lower cost, higher power density, higher output current, and lower voltage levels for digital electronics such as CPUs, memory, and microcontrollers has boosted demand for higher efficiency converters. This demand has commonly been addressed by DC/DC converters that employ synchronous rectification. To maximize efficiency, these converters use synchronous rectifiers, such as MOSFETs and other low power dissipating devices, instead of output diodes.

When synchronous rectifier MOSFETs are turned on and their controlling driving signal (gate) is not precisely controlled, they will allow current to flow back into the output section of the converter. The MOSFETs will therefore load down any preexisting voltage source connected at their output and parallel operation with current sharing may not be possible. Synchronous rectifiers can even suffer catastrophic failure if they are allowed to conduct an excessive current.

Several different schemes have been proposed for controlling synchronous rectifiers to deal with the problems associated with the negative current in synchronous rectifiers. One approach has been to avoid negative output current through the synchronous rectifier at turn-on by allowing parasitic diodes in the synchronous rectifier MOSFET to perform the rectification and then, depending on the status of a monitoring parameter or a time delay, enabling the synchronous rectifiers. But if the synchronous rectifiers are turned on after a time delay, even with no load, the input current to the converter can be 10 to 20 times higher than those converters with rectifying diodes due to the switching losses of the synchronous rectifier and the negative output current.

Prior art solutions generally rely on some kind of monitoring circuit to sense a chosen parameter, such as current, voltage, temperature, or transformer duty cycle (Zhang, U.S. Pat. No. 6,490,183), and thereby control the synchronous rectifiers and avoid negative current while boosting efficiency. Boylan (U.S. Pat. No. 6,618,274 B2) offers a control scheme for synchronous rectifiers that not only requires the input of the monitor circuit, but also switches from partially synchronous mode to full synchronous mode. These approaches generally result in increased converter cost and complexity, and do not necessarily provide for optimum performance.

SUMMARY OF THE INVENTION

In one general aspect, the invention features a converter that includes at least one input line operative to receive power from a first supply and at least one output line operative to supply power to a first load with a positive current. A switching conversion circuit is also included for converting input power into output power. This circuit includes one or more input switches each having a switch control input, one or more synchronous rectifiers each having a switch control input and an output operatively connected to the output line of the converter, and one or more energy storage elements operatively connected to the output line of the converter. A synchronous rectifier control circuit has an output operatively connected to a least one of the synchronous rectifiers via its switch control input and includes circuitry operative to cause the synchronous rectifiers to selectively block or pass a negative current from flowing in the output line.

In preferred embodiments, the synchronous rectifier control circuit can include circuitry operative to pass a negative current when the load is reduced and to block the negative current when the load is increased. The synchronous rectifier control circuit can include circuitry operative to pass a negative current when the output switches from full load to no load and to block the negative current when the output switches from no load to full load. The energy storage elements can include at least one output capacitor operatively connected to the output line of the converter. The converter can be a DC/DC converter. The converter can be a bridge converter. The converter can be an isolation amplifier. The converter can be a resonant converter.

In another general aspect, the invention features a conversion method that includes receiving input power, converting the input power, supplying a positive output current obtained from the step of converting to a load, blocking a negative current when the load is increased, and passing a negative current when the load is decreased.

In a further general aspect, the invention features a converter that includes an input stage including at least one switching device, an output stage including at least one synchronous rectifier operatively connected to an output of the converter, and an open-loop synchronous rectifier driving circuit. The driving circuit includes at least one driving output operatively connected to an input of the synchronous rectifier, at least one input operatively connected to a timed signal line in the input stage, and the open loop synchronous rectifier driving circuit is operative independently of any timing information from the output stage.

In preferred embodiments, the synchronous rectifier driving circuit can selectively allow current to flow during load switching at the output of the converter. The synchronous rectifier driving circuit can operate independent of any adjustment of the input stage. The input stage can include a modulator with the synchronous rectifier driving circuit operating independently of any adjustment of the modulator. The input stage can include a pulse-width modulator with the synchronous rectifier driving circuit operating independently of any adjustment of the modulator. The synchronous rectifier driving circuit can include at least one input operatively connected to a drive signal for the switching device. The driving circuitry can AC couple the timed signal line to the driving output of the synchronous rectifier driving circuit. The output stage can include primary and secondary output inductors and with the driving circuitry being powered by the secondary output inductor. The converter can be a DC/DC converter. The converter can be a bridge converter. The converter can be an isolation amplifier. The converter can be a resonant converter.

In another general aspect, the invention features a conversion method that includes switching power in an input stage, synchronously rectifying the switched power in an output stage, and deriving timing for the step of synchronously rectifying from timing for the step of switching input power independent of any timing information from the output stage.

In a further general aspect, the invention features a converter that includes at least one input line operative to receive power from a first power supply, at least one output line operative to supply power to a first load with a positive current, a share input line, and a switching conversion circuit. The switching conversion circuit is for converting input power into output power and includes one or more input switches each having a switch control input, one or more energy storage elements operatively connected to the output line of the converter, and a circuit path between the share input line and the control inputs of the input switches such that the control inputs of the input switches are responsive to timing signals on the share input line of the converter.

In preferred embodiments, the switching conversion circuit can further include one or more synchronous rectifiers operatively connected to the output line. The synchronous rectifiers can be MOSFETS. The switching conversion circuit can include two input switches each having a control input responsive to the timing signals and further include a pair of synchronous rectifiers operatively connected to the output line. The circuit path can include a microprocessor between the share input and the two input switches. The converter can further include a synchronization output responsive to the share input to enable daisy-chaining of the converter. The converter cam further include a modulator having a disable input and at least one output that can be operatively connected to one or more of the control inputs to enable stand-alone operation of the converter. The converter can further include a synchronization output responsive to the share input to enable master operation of the converter. The converter can be operative in a slave mode independent of any switch timing information generated in the converter. The converter can be a DC/DC converter.

In another general aspect, the invention features a conversion method that includes receiving modulator timing signals by a second converter from a first converter, using the timing signals to time conversion switching operations in the second converter, and providing by the second converter an output current to a common load that also receives an output current from the first converter.

Power converters according to the invention are advantageous in that they can control their synchronous rectifiers such that they perform as rectifying diodes when operated with no load and perform synchronous rectification from no-load to full-load transients. They can also selectively allow for a negative output current to pass through the rectifiers to improve performance during full-load to no-load transients.

BRIEF DESCRIPTION OF THE DRAWINGS

FIG. 7B is a timing diagram for the PWM in FIG. 7A;

DETAILED DESCRIPTION OF AN ILLUSTRATIVE EMBODIMENT

Figure 1:
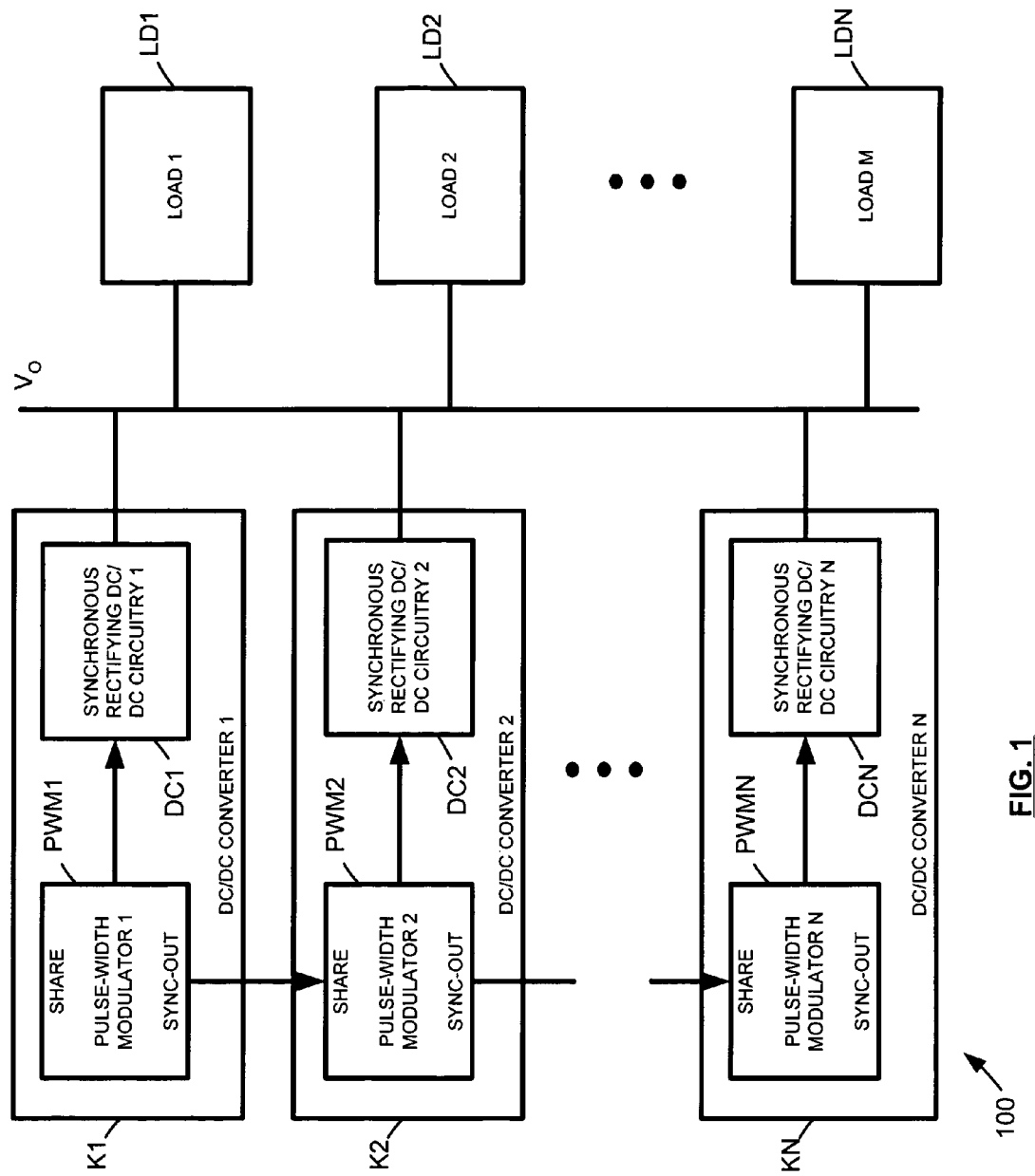
FIG. 1 is a block diagram of a power conversion system based on multiple DC/DC converters according to the invention.

Referring to FIG. 1, an illustrative current-sharing power conversion system according to the invention is based on one or more DC/DC converters K1, K2, . . . KN that employ synchronous rectifying DC/DC circuitry DC1, DC2, . . . DCN to drive one or more loads LD1, LD2, . . . LDN. The converters can employ a control scheme that exploits the disadvantages of the MOSFETs, eliminates negative output current at turn-on and turn-off, performs synchronous rectification throughout the input voltage and load ranges, and allows negative current when the load is stepped from full load to no load.

Figure 10:
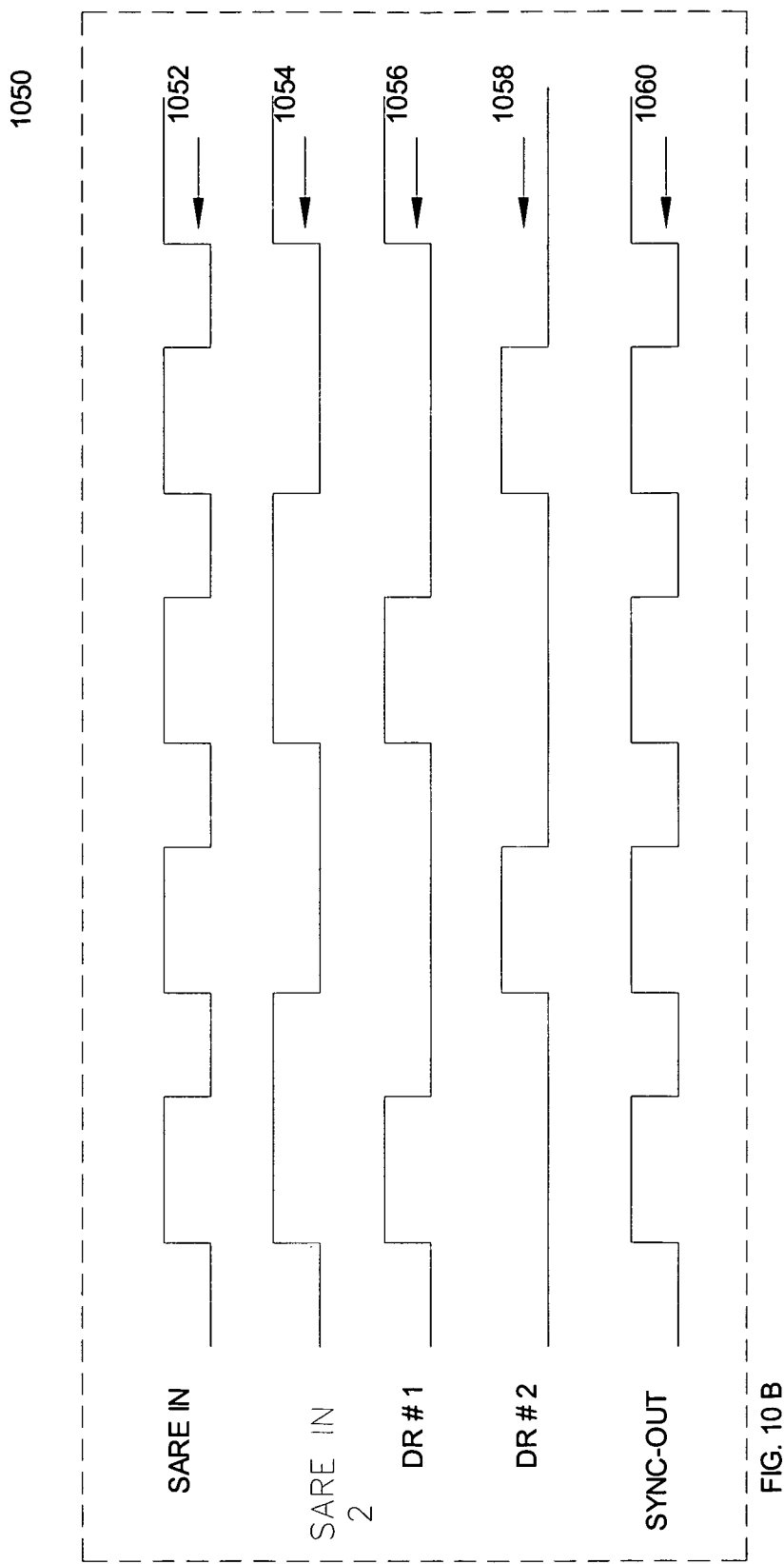

The converters K1, K2, . . . K3 can operate as master and slave in a parallel-connected current sharing configuration, as presented in more detail below in connection with FIGS. 10A and 10B. To this end, each converter includes a share input and a synch-out output, and the synch-out output can be connected from one converter to the share input of the next in a daisy-chained configuration. The first of the converters K1 in this configuration acts as a master that provides timing signals from its pulse width modulator PWM1 to subsequent slave converters K2 . . . KN. Note that while it is generally advantageous to provide a single converter that can operate as a master or a slave, it is also possible to provide different master and slave parts.

Figure 2:
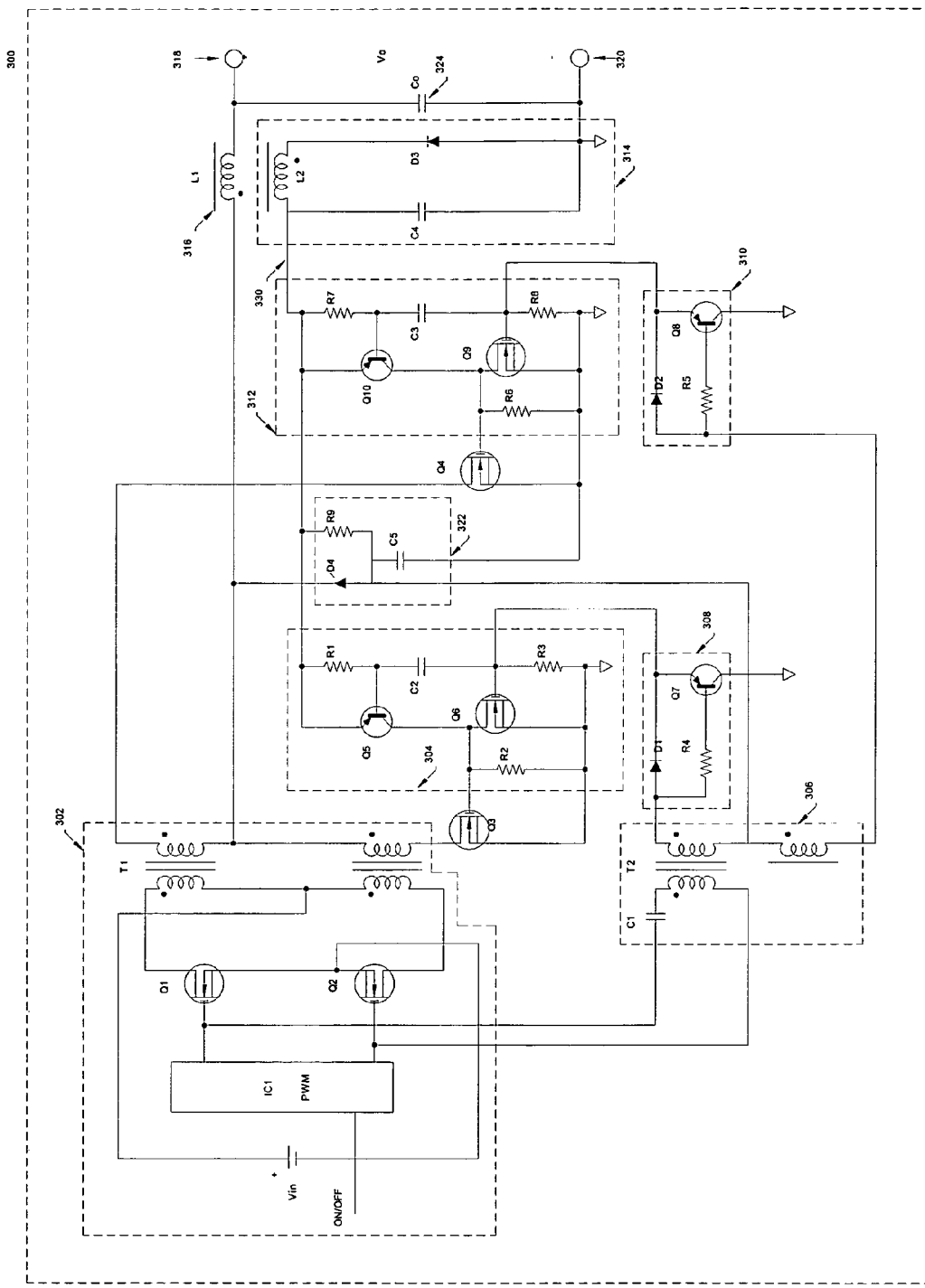
FIG. 2 is a schematic diagram of a push-pull DC/DC converter for use in the system of FIG. 1.

Referring to FIG. 2, a schematic diagram for a push-pull DC/DC converter 300 (e.g., K1) is shown sectioned into blocks. The input stage of the converter 302 includes IC1 (which can be a current- or voltage-mode pulse width modulator), push-pull transistors Q1, Q2 and power transformer T1. The secondaries of T1 are connected to synchronous rectifiers Q3, Q4 and the center tap of T1 is connected through the output inductor 316 to the output capacitor Co 324 and output positive terminal 318. The gate signals of Q1, Q2 of block 302 are connected to block 306.

Block 306 through C1 and the primary of the pulse transformer T2 provides isolation and drives through the two secondary windings of the two identical wave shaping blocks 308 and 310. The center tap of T2 in block 306 is connected to block 322. Through D4 in block 322 the center tap of T2 in 306 is connected to inductor L1 316, and through C5 in 322 to output ground 320.

The pull-up resistor R9 charges C5 while D4 in 322 discharges C5 when the inductor L1 316 goes through its flyback cycle. When the converter is turned off, any charge remaining in C4 after D4 is reversed biased in block 314 is removed through blocks 308 and 310 and pull-down resistors R3 and R8 in blocks 304 and 312 respectively.

Figure 3:
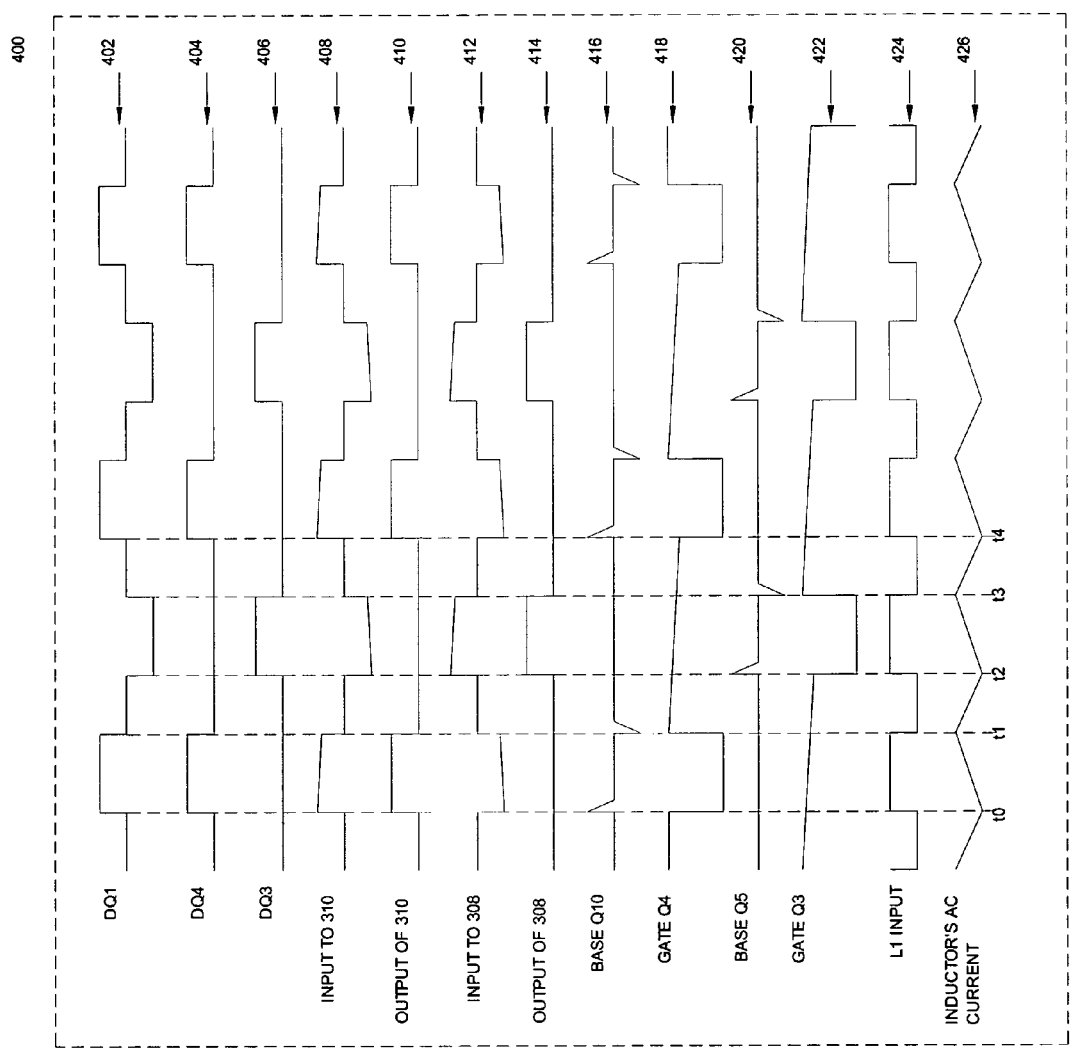
FIG. 3 is a timing diagram for the converter of FIG. 2.

Presented in FIG. 3 is a timing diagram 400 for the converter of FIG. 2 in a steady-state condition. At t0, the gate of Q1 in 302 goes low as its drain goes high 402. The negative transition of the gate of Q1 through block 306 appears as the input to both pulse shaping blocks 308 and 310 at 180° out of phase. The input to block 310 waveform 408 goes positive while the input to block 308 waveform 412 goes negative. The propagation delay through blocks 306 and 308 or 310 is set by the switching characteristics of the selected components and is a fraction of that associated with Q1, Q2 and T1 in block 302. If required, any additional delay will be provided by the components in 304 and 312.

The positive transition of the output of block 310 turns Q9 in block 312 on and synchronous rectifier Q4 off (waveform 418) just before the drain of Q4 transitions positive (waveform 404). At the same time, t0, the gate of the other synchronous rectifier Q3 waveform 422 is high and its gate capacitor continues to discharge through R2 in block 304. The input voltage to the inductor L1 316 goes high (waveform 424), while its AC current starts to ramp up. At t1, the output of block 310 waveform 410 goes low turning off Q9 and through C3 momentarily drives the base of Q10 low (waveform 416).

Maximum current is allowed through Q10 to charge the gate of Q4 turning Q4 on (waveform 418) just after the drain of Q4 goes low (waveform 404). From t1 to t2, both synchronous rectifiers are on and provide the lowest possible resistance for the inductor current during this flyback phase (also known as a dead time). At t2, the output of block 308 transitions high (waveform 414), turns on Q6 in block 304 and discharges completely the gate capacitance of Q3 just before the drain voltage of Q3 goes high. At t3, the output of block 308 goes low and this negative transition turns on momentarily Q5 in block 304 and charges the gate capacitance of Q3 and thus turns on Q3 waveform 422 just after the drain voltage of Q3 goes low. From t1 to t2 and t3 to t4, both synchronous rectifying transistors are on to provide a resistive path for the inductor current.

Referring to FIG. 2, block 314 provides the voltage required for the drivers in blocks 304 and 312. This auxiliary power supply consists of L2, which is a secondary winding of the output inductor L1 316.

Diode D3 rectifies the voltage of L2 and C4 filters the output providing a DC voltage at 330, which is proportional to the output voltage and output current of the converter. Capacitor C4 in block 314 is selected to provide enough current to charge both input gate capacitors of the synchronous rectifiers Q3, Q4 for one to two switching cycles.

It should be apparent to those familiar with the art that both the bipolar transistor Q5 and MOSFET Q6 in the driver 304 can be AC coupled to wave shaping block 308 and the propagation delay of the input signal to the driver can be increased by inserting series resistors between C2 and the base of Q5 and form the gate of Q6 to the junction of C2 and R3 in block 304.

Also, the high turn-on voltage of MOSFET Q6 VGS>=1.5V plus the forward voltage of D1 in 306 allows for any DC voltage shift around the zero volt point during the dead time periods, t1 to t2, t3 to t4, in the secondary winding of T2 in block 306.

Figure 4:
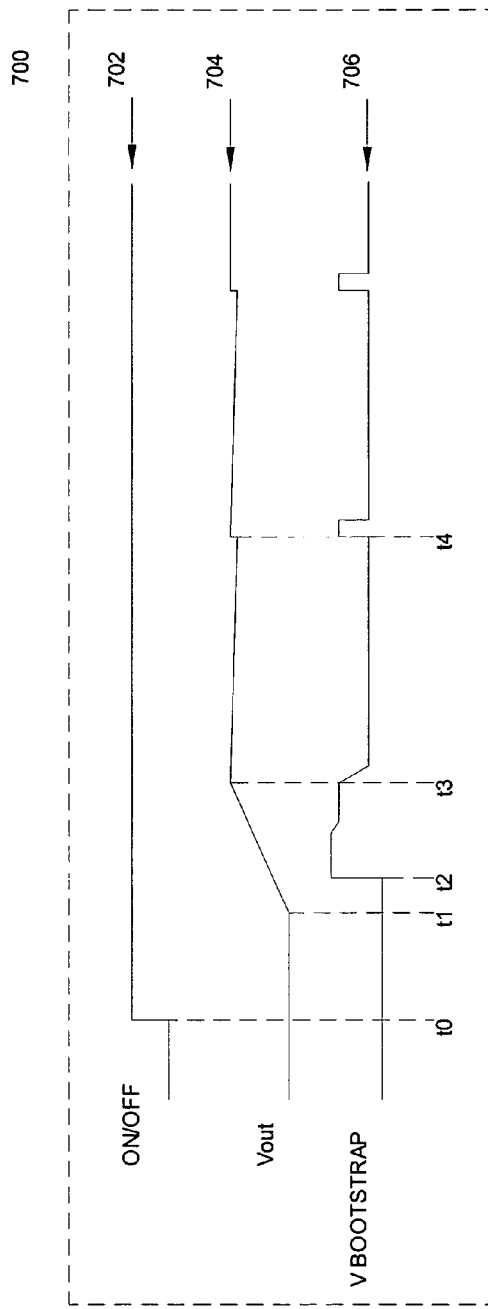
FIG. 4 is a timing diagram for a turn-on sequence for the converter in FIG. 2.

The timing diagram 700 shown in FIG. 4 illustrates the turn-on sequence and no-load operation of the converter of FIG. 2 300. At t0, the On/Off 702 signal is applied. After a time delay from t0 to t1, the so-called turn-on delay of the output of the converter Vout 704 goes into a soft-start phase and starts to ramp up charging the output capacitor. Depending on the value of the output capacitance and its initial charge, the output current is high and is only limited by the low on duty cycle ratio of the PWM IC1 in 302. The high output current through L1 316 induces a voltage on the bootstrap winding L2 in block 314 and at t2 waveform 706 powers both MOSFET drivers 304 and 312 in 300. The slew rate of waveform 706 at t2 is almost instantaneous and does not follow the Vout 704 waveform due to the fact that the capacitance of C4 in block 314 is much less than the output capacitance Co 324.

From t2 to t3, the synchronous rectifiers are turned on and efficiently charge the output capacitors. At t3, Vout 704 reaches its final state. The PWM IC1 in 302 turns both of its outputs off through a feedback loop and turns off both synchronous rectifiers Q3, Q4 in 300. Also at t3, the output current of the converter drops to a few mA as required by the error amplifier and output control circuitry. The bootstrap voltage also drops close to zero volts. With no load connected at the output, the output capacitors start to slowly discharge by the output control circuitry. When the output voltage reaches the lower threshold of the error amplifier, the PWM turns on at t4, which then turns on the synchronous rectifiers until the output voltage in Co 324 is restored to Vo Nominal.

With no load, therefore, this synchronous rectifying converter behaves similarly to rectifying diodes and thus the no-load input power is minimized. The synchronous rectifiers are turned on as needed and negative output current is not allowed at turn-on even when the output of the converter is connected in parallel to the same output voltage bus.

Consider a hot-pluggable application where multiple converters are operated in parallel and one converter fails. As soon as a replacement converter is plugged in, the output control circuit and the converter's output capacitor Co 324 will be biased from the bus voltage, and even before the converter enters the soft-start routine (from t0 to t1 in diagram 700), will now allow the PWM to turn on. When the output bus voltage is lower that the converter's nominal output, the converter will enter its soft-start routine and reach nominal output between t1 and t2 even before the bootstrap voltage is established due to the fact that the output capacitor is close to nominal output and the output current of the converter is low. Digital current sharing will allow for operation of multiple converters and will be described in more detail below.

Figure 5:
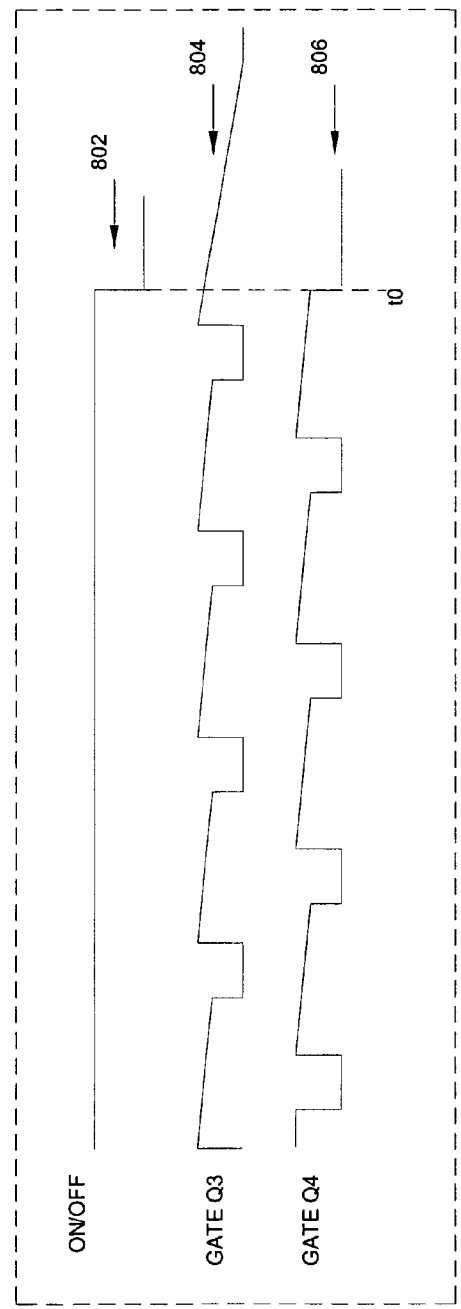
FIG. 5 is a timing diagram for a turn-off sequence of the converter in FIG. 2.

The turn-off sequence of the synchronous rectifiers is shown in the timing diagram 800 presented in FIG. 5. When the On/Off signal 802 goes low, the outputs of the PWM IC1 in block 302 go low, thus any input signal to the drivers 304, 312 of the synchronous rectifiers Q3 and Q4 is removed.

In FIG. 5, the On/Off signal is applied at t0 when the gate of Q3 is high (waveform 804) and the gate of Q4 is low (waveform 806). The gate capacitance of Q3 continues to discharge through R2 in 304 and reaches zero within a time period of the converter's switching period, while Q4 remains off. Negative current is therefore not allowed during turn-off.

As pointed out previously, the selection of components is important in achieving maximum efficiency without sacrificing any features of this converter. For example, when multiple MOSFETs are connected in parallel to perform synchronous rectification, it should be understood that the gate capacitance is increased and the driving requirement will also increase.

Figure 6:
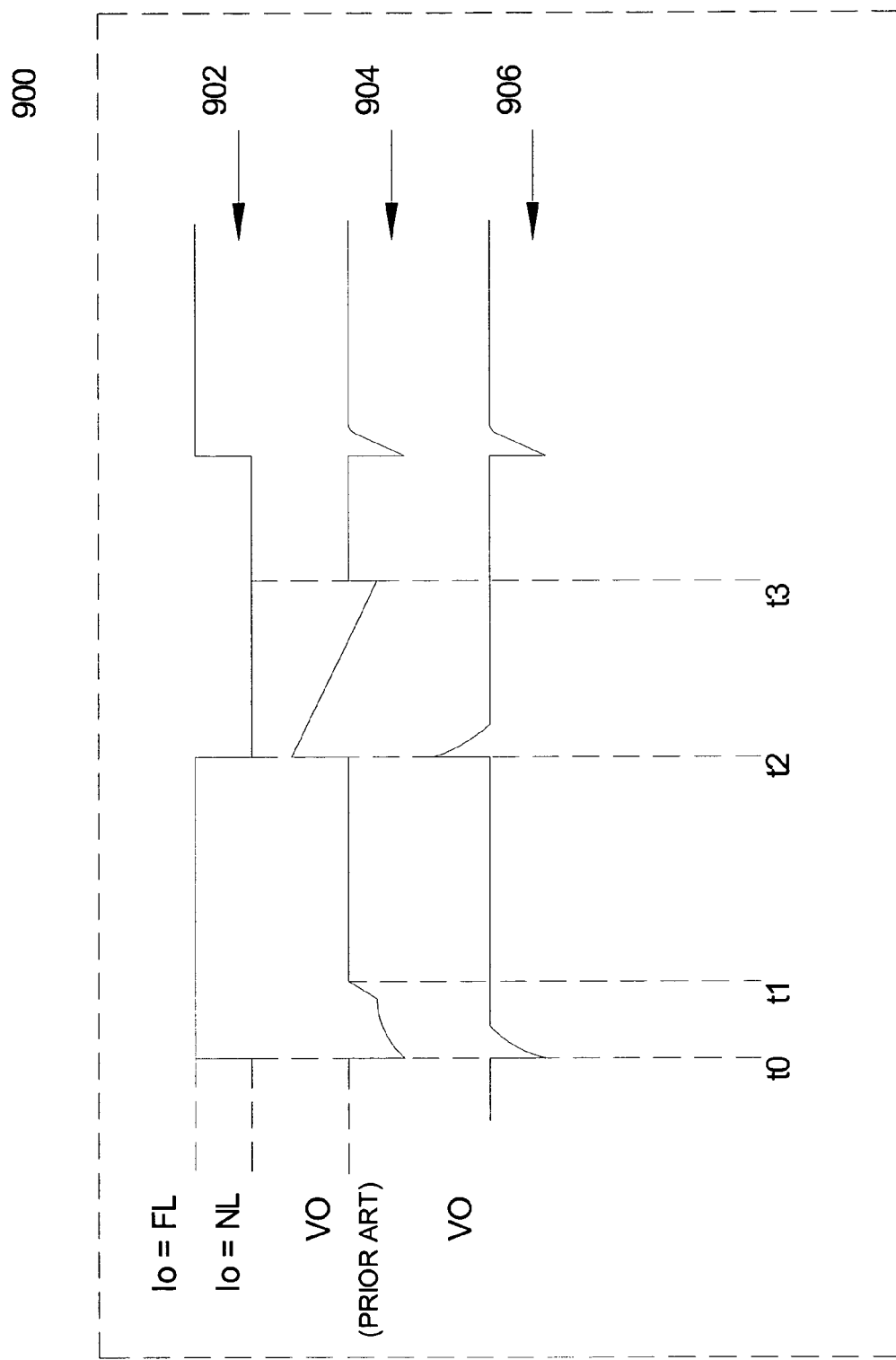
FIG. 6 is a timing diagram for a no-load to full-load step for the converter in FIG. 2.

FIG. 6 presents a timing diagram 900 for a stepping load. Waveform 902 is for the output current of the converter stepping from no load to full load. The output Vo 904 of a prior art converter is presented for comparison purposes with the output of the present invention Vo 906. At t0 in 900, when the output load steps from no load to full load, Vo 902 (prior art) takes longer to recover (t0 to t1) due to the delay required by the monitoring circuitry to inform the controller (usually a PWM) and because the prior art converter does not allow negative output current. At time t2, when the load is removed (full load to no load) and if a negative output current is not allowed, the output of the converter will overshoot as in the prior art 904 and wait for the output control circuitry to discharge the overcharged output capacitor at t3. In contrast, when a negative output current is allowed, the negative output current discharges the overcharged output capacitance before the error amplifier at the output starts to react due to the propagation delay from the error amplifier opto-isolator and the delay associated with the PWM. By allowing the synchronous rectifier to sink current from the output capacitor when the load steps from full load to no load as the present invention does (waveform 906), the performance of the converter is improved.

The present embodiment's ability to allow for negative current during load stepping is particularly important in applications such as voltage regulating modules (VRM) and high power CPUs (e.g., Intel Pentium and AMD Athlon), where voltage identification codes (VID) are supplied from the CPU to adjust its own supply voltage. Bus converters, such as 48Vin to 12Vout converters, that supply the VRMs for the CPUs must offer very fast step load response.

Figure 7A:
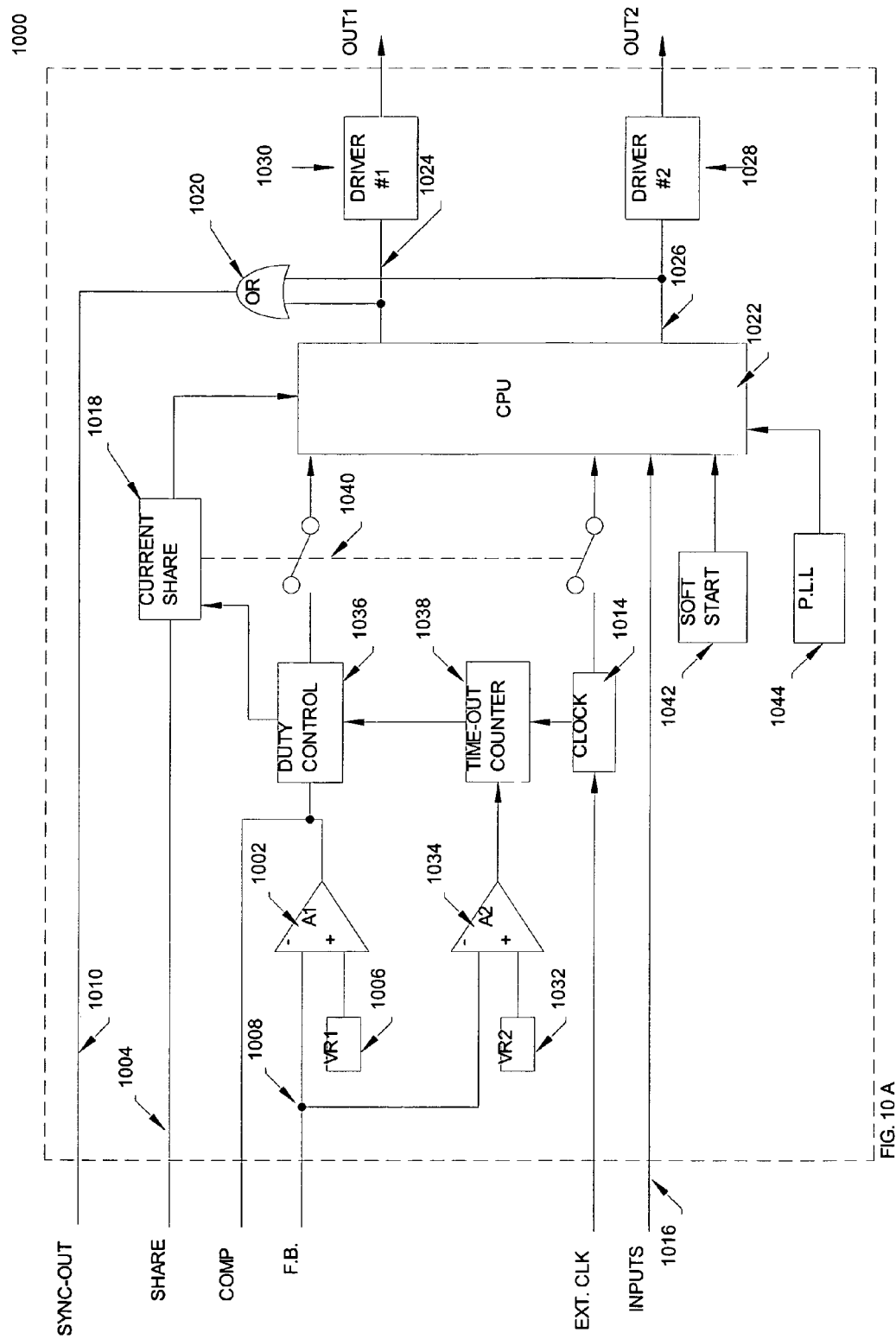
FIG. 7A is a schematic diagram of an advanced Pulse-Width Modulator (PWM) for use in the system of FIG. 1.

Presented in FIG. 7, the block diagram of a pulse width modulator (PWM) is presented. It operates as any prior art voltage or current mode with the following additional features:

It allows the converter to sink current from its output on demand either by the output load or output voltage setting.

It offers multiple converter synchronization and output current share.

Specifically, the PWM 1000 has an error amplifier A1 1002 and a voltage comparator A2 1034. The feedback input 1008 is connected to the negative input of the amplifier A1 1002 and comparator A2 1034. The positive input of A1 is connected to voltage reference VR1 1006, while the positive input to the comparator A2 1034 is connected to a voltage reference VR2 1032. Reference VR2 1032 is set lower than VR1 1006. When the feedback input drops below VR2, (for example, during a full-load to no-load output load step), comparator A2 1034 reacts faster than amplifier A1 1002 and sets the output of A1 for a minimum duty cycle through the duty cycle control block 1036 and starts the time-out counter 1038. The minimum duty cycle allows the synchronous rectifiers to sink current from the output while the feedback voltage remains below VR2 1032. If during the predetermined time-out period, the feedback input voltage remains lower than VR2 (VFB<VR2), amplifier A1 1002 becomes active and turns both drivers 1030 and 1028 off after the time-out period.

If the FB input 1008 becomes higher (VFB>VR2) before the time-out counter 1038 reaches its maximum count, comparator A2 1034 returns control to A1 1002 by removing the minimum duty cycle from the output of A1 and resetting the counter in block 1038. The additional time provided by the time out counter to the synchronous rectifier is required to sink current from the output of the converter when large output capacitors are used in high power converters with output current Io>15 A.

When multiple converters are connected in parallel to increase the output power for a given voltage output, the sync out 1010 of the PWM 1000 in the N converter is connected to the share input 1004 in the N+1 converter. In prior art converters without synchronous rectifiers, the N to N+1 connection described above was used to synchronize the switching frequency of multiple converters in a so-called "Master-Slave" operation, while the output current share involved series current sense resistors and additional control circuits, which tended to increase the power dissipation and complexity of the converter.

When the PWM 1000 senses an input at its share input 1004, it waits for the next "dead time" period (a condition when both output drivers are low) of its internal clock 1014 and disconnects both the error amplifier 1002 and internal clock 1014 from the CPU 1022 through the dual switch 1040. At the same time, the share input signal from the N converter becomes the clock to the N+1 converter. The switchover from the internal clock 1014 to the share input clock 1004 during the dead time period of the internal clock will allow for continuous operation of the synchronous rectifiers and is required only when both converters are on and the share input is connected form N to the N+1 converter or if one of the N converters happen to fail.

The share input signal 1004 to the N+1 converter is the sync out 1010 of the N converter generated by ORing 1020 the input signals 1024, 1026 to driver #1 1030 and driver #2 1028.

The sync out 1010 signal is identical to the share input 1004 signal with the same frequency and duty cycle delayed by a few nanoseconds required by the CPU 1024 to perform frequency division by two and pulse steering for the drivers as shown in the timing diagram in FIG. 7B 1050. The share input 1052 in FIG. 7B goes through a flip-flop to divide the share input frequency by two (waveform 1054). Then the complimentary outputs of the flip-flop are used for pulse steering of the share input to the drivers 1056 and 1058 by performing the OR function of the share input 1052 and Q, and Q output of the flip-flop (not shown here).

Referring back to FIG. 7A, the output of the error amplifier 1002 is disconnected from the CPU 1022 in order to allow the slaved converter to operate as an open-loop type in case one of the outputs of the slave converters is set lower than the master. The converter with the lower output voltage set will deliver less current to the output load or it will start to sink current from the output.

For output over voltage protection (OVP), a second feedback loop remains active for each slave converter. The OVP signal arrives at the CPU 1022 through the input bus 1016. The input bus 1016 may have many other inputs, such as over temperature, current limit, input over-voltage, input under-voltage.

Frequency synchronization and output current share can be achieved through one bi-directional or multifunction pin. Other functions such as soft-start 1042 and phase-locked-loop (PLL) 1044 can be included on board or included in the input bus 1016.

Figure 8:
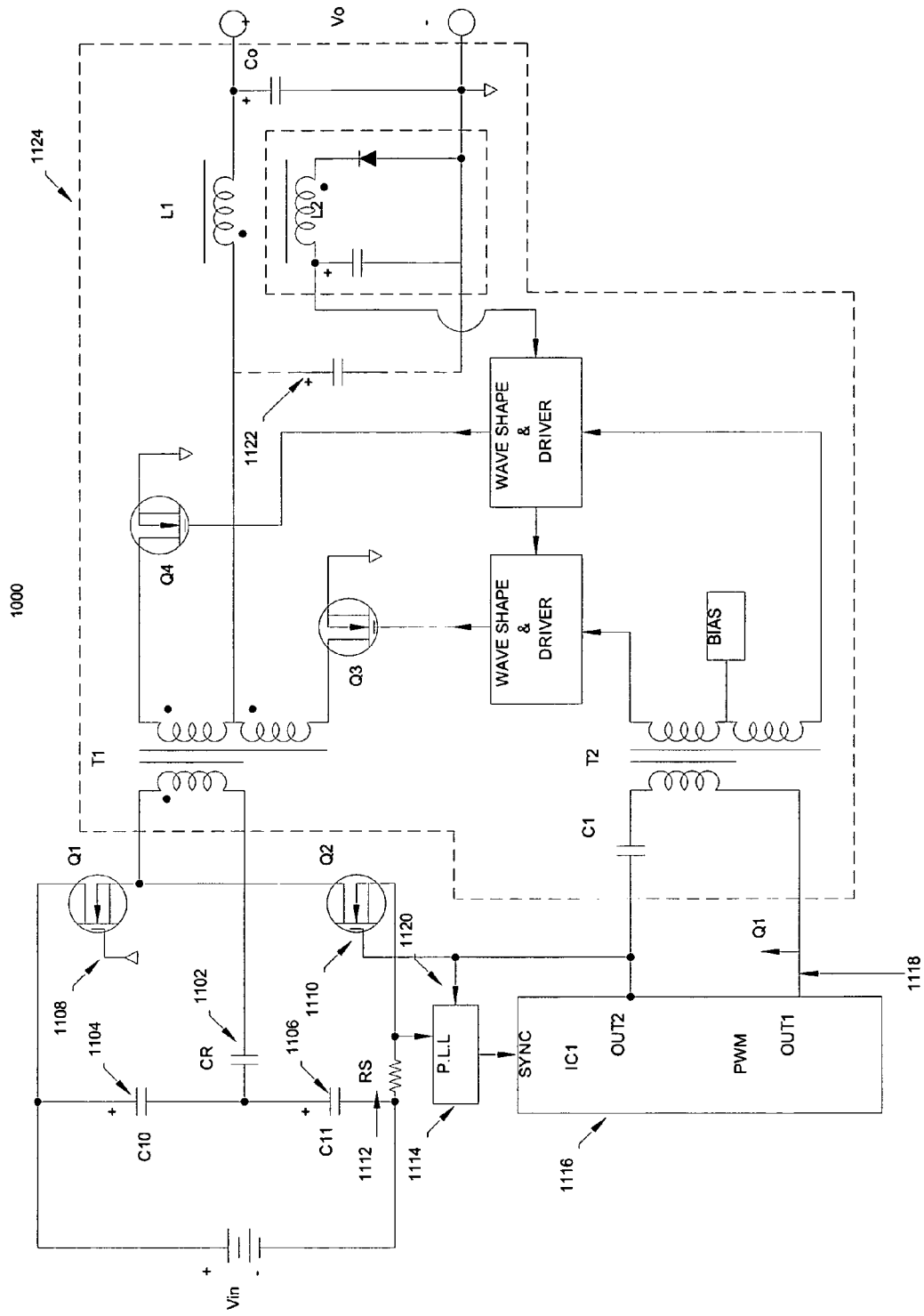
FIG. 8 is a schematic diagram for a half-bridge resonant DC/DC converter with output synchronous rectification according to the present invention.

FIG. 8 presents a block diagram of a resonant half-bridge converter with synchronous rectification 1100. The output block 1124 of the converter in FIG. 8 operates exactly as the converter presented in FIG. 2. The input transistor Q1 1108 and Q2 1110 with the primary of T1 and capacitors C10 1104, C11 1106 form the power stage of a half-bridge converter. The dotted end of the primary of T1 is connected at the junction of the source of Q1 1108 and the drain of Q2 1110. The other end of the primary is connected at one terminal of the resonant capacitor CR 1102 and the other terminal of CR is connected at the positive terminal of C11 1106 and the negative terminal of C10 1104.

The outputs of IC1 PWM 1116 drive the switching MOSFET and the pulse transformer T2 through C1. The resonant tank is formed with CR 1102 and the leakage inductance of T1. The source of Q2 1110 through a current sense resistor RS 1112 is connected together with the negative terminal of C11 1106 to the negative terminal of the power source Vin, while the positive terminal of the power source is connected to the positive terminal of C10 1104 and the drain of Q1 1108. The current through RS 1112 is one of the inputs of the PLL 1114 and output #2 1120 of PWM 1116 is the other.

At resonance, the duty cycle of the current through RS 1112 and output #2 1120 are equal and the phase error of the two inputs to the PLL 1114 is zero. The output of the converter adjusts the switching frequency of the PWM such that resonance is maintained under any line or load condition within a predetermined error band around the switching frequency of the converter (typically ±10% of the switching frequency).

The PLL can be an analog or digital circuit and external or internal to the PWM. The main function of PLL 1114 is to compensate for the tolerance of the resonant tank and PWM. This allows for the use of higher tolerance and less expensive components in manufacturing and eliminates the need for fine-tuning of the tank during production. The locking range of PLL 1114 can be as much as ±10 around the switching frequency of the PWM. Even though the PLL 1114 monitors the current only through one of the transistors in the half bridge, it can be used with any resonant circuit such as full-bridge, push-pull, forward or other topologies. It can have multiple inputs such as both outputs 1118, 1120 of the PWM and the current sense resistors RS 1112 can be replaced by a current sense transformer.

The resonant converter in FIG. 8 can offer all of the benefits of the present invention plus reduced input and output noise due to zero-current switching of both input transistors and synchronous output rectifiers. By inserting capacitor 1122 in the output section and eliminating the error feedback loop from the converter in FIG. 8 1100, it can be used as a "bus converter." So-called bus converters are unregulated type converters, such as 48Vin 12Vout, where Vout=X Vin (i.e., Vout is proportional to Vin). X is a constant and is typically the transformer turn ratio. For the above given numbers, X=12/48=0.25. The "bus" voltage is 12 volts and is used as the input power bus for the step-down converters VRM for powering high power CPUs.

Figure 9A:
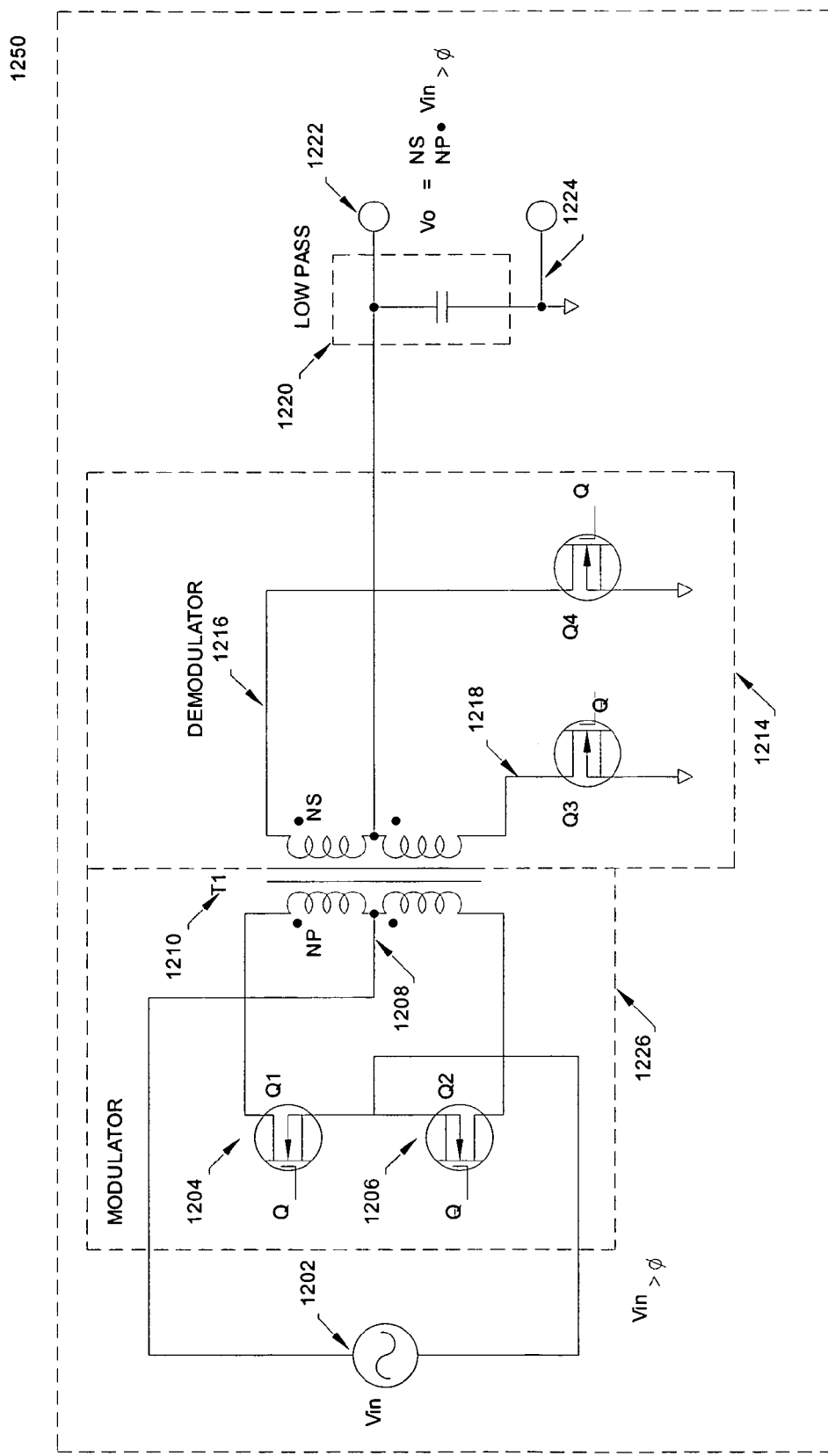
FIG. 9A is a schematic diagram of an isolation amplifier according to the present invention.

Referring to FIG. 9A, the block diagram of an isolation amplifier 1200 is presented. This embodiment takes advantage of the bipolar current through the synchronous rectifiers to perform high-speed modulation/demodulation for a low cost, low power isolation amplifier (IA), which can transfer power, signals, or both. The high speed of the IA in 1250 is due to the fact that it requires very small capacitor and the synchronous rectifiers can charge/discharge it very fast. In FIG. 9A, a push-pull converter performs both the modulation and demodulation.

Figure 9B:
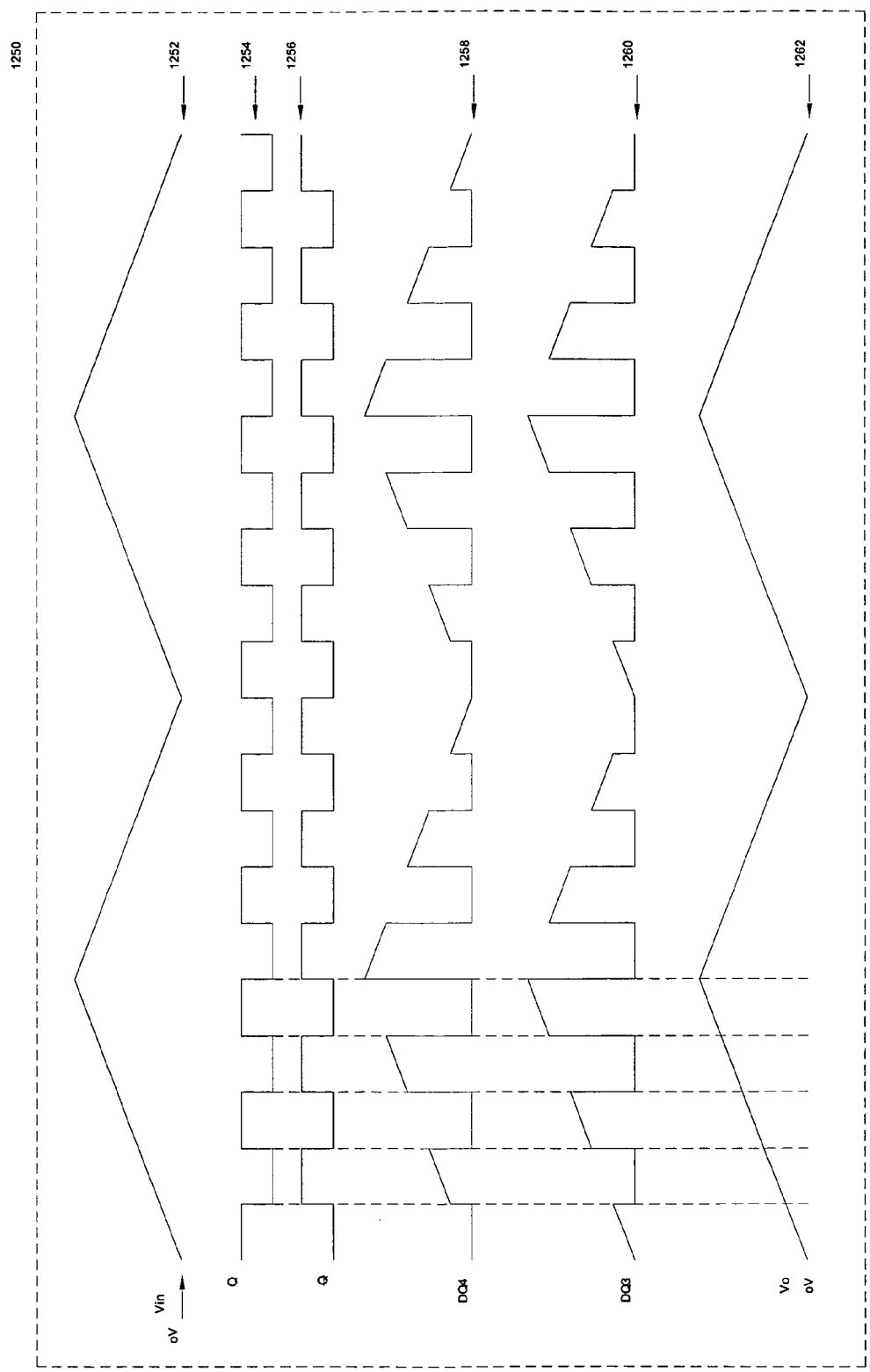
FIG. 9B is a timing diagram for the isolation amplifier of FIG. 9A.

Specifically, the center tap of T1 1210 is connected to one side of the input voltage Vin 1202, while the other side of Vin is connected to the source of Q1 1204 and source of Q2 1206. The drain of Q1 1204 is connected to one primary side of T1 1210 and the other side of the primary of T1 is connected to the drain of Q2. The gate of Q1 1204 is driven by a square wave Q with 50% duty cycle (FIG. 9B, waveform 1254). The gate of Q2 1206 is driven with the complement of Q, Q*. The same two signals through a pulse transformer drives the gates of the synchronous rectifiers Q for Q4 and Q* for Q3. The drain of Q3 1218 is connected to one side of the secondary of T1 1210 while the other side of the secondary of T1 is connected to the drain of Q4 1216. The center tap of the secondaries of T1 is connected to a low pass filter 1220 and to the positive output 1222. The drains of Q3 and Q4 are connected to the output ground 1224.

Modulation is performed by the modulator block 1226 and demodulation by the demodulator block 1214. The carrier's frequency can be in the order of MHz allowing Vin to vary from DC to a few KHz below the carrier frequencies. The only potentially limiting factor for the speed of this isolation amplifier is the parasitic capacitors of the transistors and the transformer T1 1210. Other topologies such as half-bridge, full-bridge, and resonant can be used for both input and output sections.

The isolation amplifier in FIG. 9A operates only with positive input (Vin>=zero). For bipolar operation, other known analog techniques can be used such as input rectification or voltage offsetting. The carrier frequency Q, Q* can be generated from the oscillator of an onboard DC/DC converter typically used to power the input stage of the isolation amplifier or an external clock.

Referring to FIG. 9B 1250, the waveforms of a unity gain Vo=(ns/np)*Vin, where ns=np=1, is presented. The analog signal Vin 1252 is modulated by Q 1254, Q 1256 and appears at the drains of Q4, DQ4 1258, Q3 DQ3 1260. Vo is the demodulated output signal 1262.

The present invention has now been described in connection with a number of specific embodiments thereof. However, numerous modifications which are contemplated as falling within the scope of the present invention should now be apparent to those skilled in the art. For example, while the principles of the present invention can be applied to DC/DC converters, they may also be applied to other types of switching power conversion circuits, such as AC-DC converters. And while the invention has been described in connection with push-pull switching converters, its principles can also be applied to full-bridge, half-bridge, forward, and flyback switching converters. One of ordinary skill in the art would also recognize that various functional groupings within the conversion systems can be replaced with different but equivalent groupings. Moreover, the interconnections between the components in the circuits can include intermediate elements such as buffers, connectors, filtering components, or even intermediate circuitry that provides additional functionality, without departing from the inventive concept presented herein. It is therefore intended that the scope of the present invention be limited only by the scope of the claims appended hereto. In addition, the order of presentation of the claims should not be construed to limit the scope of any particular term in the claims.

What is claimed is:

1. A converter, comprising:
   at least one input line operative to receive power from a first supply,
   at least one output line operative to supply power to a first load with a positive current,
   a push-pull switching conversion circuit for converting input power into output power and including:
   one or more input switches each having a switch control input,
   a transformer having primary windings responsive to the input switches,
   two independently controlled synchronous rectifiers operatively connected to secondary windings of the transformer each having a switch control input and an output operatively connected to the output line of the converter in a push-pull configuration,
   one or more energy storage elements operatively connected to the output line of the converter, and
   a fixed-frequency synchronous rectifier control circuit having an output operatively connected to each of the synchronous rectifiers via its switch control input to independently control them, and including circuitry operative to cause the synchronous rectifiers to selectively both:
   a) pass a negative current when stepping to a reduced load, and
   b) block the negative current when stepping to an increased load during operation of the converter after startup but before shutdown.

2. The apparatus of claim 1 wherein the synchronous rectifier control circuit includes circuitry operative to pass a negative current when the output switches from full load to no load and to block the negative current when the output switches from no load to full load.

3. The apparatus of claim 1 wherein the energy storage elements include at least one output capacitor operatively connected to the output line of the converter.

4. The apparatus of claim 1 wherein the converter is a DC/DC converter.

5. The apparatus of claim 1 wherein the converter is an isolation amplifier.

6. The apparatus of claim 1 wherein the converter is a resonant converter.

* * * * *